June 2, 1936.　　　P. H. MACNEIL　　　2,043,107
DIRECT CURRENT AMPLIFIER
Original Filed May 20, 1933
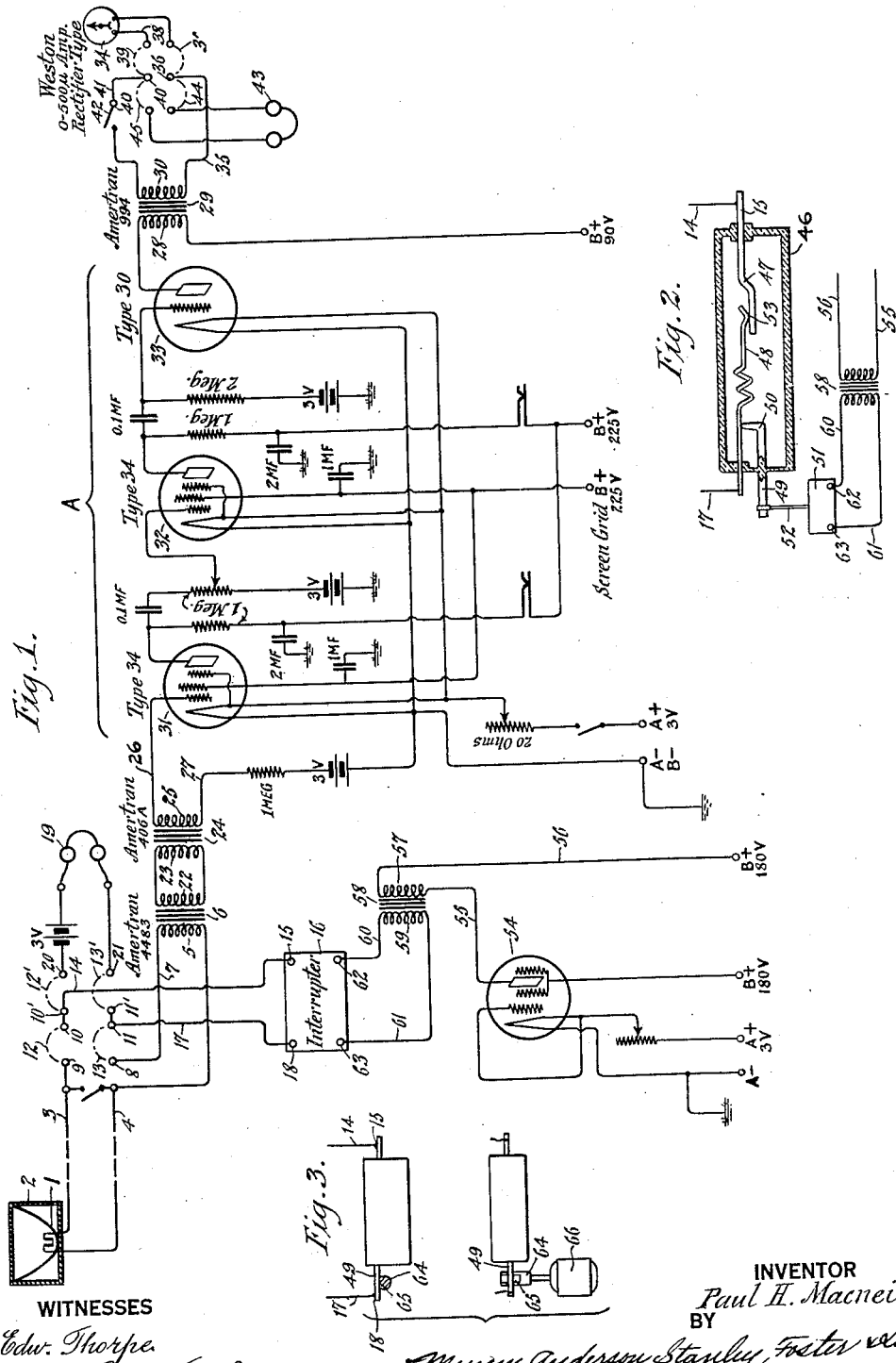
INVENTOR
Paul H. Macneil
BY
Munn, Anderson, Stanley, Foster & Liddy
ATTORNEY
WITNESSES
Edw. Thorpe
A. L. Ritchin Patented June 2, 1936

2,043,107

UNITED STATES PATENT OFFICE 2,043,107

DIRECT CURRENT AMPLIFIER

Paul H. Macneil, Huntington, N. Y.

Application May 20, 1933, Serial No. 672,081
Renewed September 13, 1935

2 Claims. (Cl. 171—95)

This invention relates to a direct current amplifier and has for an object to provide an improved construction and arrangement of parts whereby direct current of very small intensity may be amplified to workable proportions.

A further object of the invention is to provide an improved arrangement of old amplifying devices with certain new connections and devices whereby current from a thermocouple or thermopile may be amplified to operate relays, head phones, meters, loud speakers, galvanometers and other indicating devices.

In the accompanying drawing—

Figure 1 is a diagram disclosing an embodiment of the invention;

Figure 2 is a view partly in section and partly in diagram illustrating one form of interrupter which may be used in the structure shown in Figure 1;

Figure 3 is a view principally diagrammatical, illustrating another form of interrupter.

In the present invention various forms of well known amplifying devices may be used and also, if desired, a form of interrupter may be used which can take care of small currents and provide interruptions at a high rate of speed, as, for instance, two to six thousand interruptions per minute. In the structure illustrated the same has been designed especially to take the almost infinitesimal current from a thermocouple or thermopile created by a star or by a hot object at a distance and amplify this direct continuous current until it is of sufficient amplitude to operate a relay, an indicating device or other devices.

Referring to the accompanying drawing by numerals, 1 indicates a thermocouple or thermopile arranged in a hood 2 which preferably, though not necessarily, shuts out the visible light waves but allows the infra red rays or heat rays to freely enter and act on the couple or current producing device 1. It will be understood that when the term "thermocouple" is used it is intended to mean any device which will produce current directly. The terminals of the thermocouple 1 are connected to the input wires 3 and 4 by suitable switches or by being connected thereto by solder or otherwise. The wire 4 extends to the primary winding 5 of a transformer 6, while the opposite side of the primary winding is connected to the wire 7 terminating in a post or contact 8. If desired, the members 8, 9, 10, 10', 11 and 11' could be socket terminals for receiving plugs connected to suitable connecting wires for instance connecting wires 12 and 13.

The connecting wires 12 and 13 are old and well known and consist of a good conductor having a metal plug at the ends adapted to fit into the sockets as just described. The wire 3 is connected to terminal 9 and through the connection 12 is connected to the terminal 10 which in turn is connected to wire 14, which wire extends downwardly and is connected to terminal 15 of the interrupter 16. Socket 11 is connected with wire 17 but extends downwardly and is connected to the terminal 18 of the interrupter 16. An ear phone set 19 is provided with suitable wires and sockets 20 and 21 whereby the connecting members 12' and 13' may be used to connect the same to the circuit to tell whether or not the interrupter 16 is functioning properly. The interrupter 16 may be of any desired kind which will interrupt a minute current so as to convert the current into a pulsating or chopped current whereby it can function with respect to the transformer 6. Ordinarily continuous direct current will not function in respect to a transformer as transformers are used only with alternating current or with pulsating current. Therefore, the continuous direct current secured from the input wires 3 and 4 is interrupted at close intervals so that it will be converted into a pulsating current capable of functioning with respect to the transformer 6, so that the secondary coil 22 thereof may have current generated therein. Current from the coil 22 extends through suitable wires to the primary coil 23 of a second transformer 24, whereby current will be generated in the secondary coil 25.

During these various steps of transforming the current, the voltage is raised and the amperage is very low. From the output wires 26 and 27 of the transformer 24 current flows into a coupled amplification indicated by the letter "A" in Figure 1. This coupled amplification is an old and well known structure, but is used in the present instance to amplify the amperage so that a greater amperage may be supplied to the primary winding 28 of the transformer 29. Transformer 29 is so arranged that the voltage generated in the secondary 30 is much lower than the primary 28 but the amperage is much higher. The coupled amplification "A", as will be seen from Figure 1, utilizes the usual amplifying radio tubes 31, 32 and 33. Ordinarily these three stages of amplification of the current received from the thermocouple 1 is ample when the thermocouple is caused to function by the heat from a star or the heat from a distant hot object, as for instance, a lighthouse, a steamship, or the like. However, if desired a greater number of amplifying units could be used, or even a less number, without departing from the spirit of the invention. As the construction of these amplifying units and their various wires and connecting parts are old and well known, it is thought a detailed description thereof will not be necessary, but these detailed structures and wires are all illustrated in Figure 1.

While the current received in the input wires 3 and 4 is extremely small, for instance, being possibly one-millionth of an ampere at a comparatively low voltage, the output from the secondary 30 of transformer 29 is comparatively large in amperage, whereby the various ordinary electrical instruments may be operated as, for instance, a headphone, an ordinary galvanometer or an ordinary indicator operated by a magnetic coil.

As shown in the drawing an indicator 34 of the galvanometer type is shown. Instead of this galvanometer a relay could be used so as to actuate other devices as, for instance, a fog horn. The current from the winding 30 passes through wire 35 to a terminal 36. This terminal is connected by a switch or connector 37, similar to the connector 12, and consequently current may flow readily through the windings in the galvanometer 34 and back by wire 38 and the connector 37 to the terminal 40, and from thence through wire 41 to switch 42 when the same is closed to coil 30. When the headphones 43 are used suitable connectors 44 and 45 are used to connect the terminal wires of the head phone to the terminal members 36 and 40. The head phone may be used when the galvanometer 34 is disconnected, or when it is connected, as desired. When the parts are all connected up to function properly and the thermocouple 1 is effected by the heat from the sun, or any of the stars or a hot object on the earth, current will flow as just described and the needle on the galvanometer 34 will swing over. In detecting a hot object the instrument is swung gradually until it points directly at the object and, consequently the needle of the galvanometer will swing gradually to a high reading and will remain there if the instrument is held on the object. However, if the instrument is moved forward or moved back so as partly to be out of range of the hot object, or completely out of range, the needle will move back either gradually or completely to its former zero position.

Referring again to the interrupter 36 it is to be understood that any desired form of interrupter may be used, but in order to illustrate one operative form an interrupter as shown in Figure 2 may be used, said interrupter being of a construction that is now known and consisting of a vacuum tube 46 in which metal terminals 47 and 48 are arranged. The tube 46 is preferably formed of glass and has one end which is resilient formed integral with a rod 49, which has an end 50 normally resting against part of the terminal wire 48, whereby whenever this bar is moved as, for instance, pulled downwardly as shown in Figure 2, the terminal or contact member 48 will be raised out of engagement with the contact member 47 and thus break the circuit at that point. As soon as the rod 49 is released the member 48 will again move into contact with member 47, thus closing the circuit. In order that the bar 49 will function a radio loud speaker element 51 is used and is connected through a suitable rod 52 firmly to rod 49, whereby as the loud speaker vibrates the rod 49 will be raised and lowered, thereby making and breaking the circuit at point 53. In order to operate the loud speaker element 51 there is provided an oscillating tube 54 of the usual construction and connected in the usual way of oscillating tubes so that other description thereof is not thought necessary. The wires 55 and 56 are connected to the primary winding 57 of a transformer 58, and a secondary coil 59 is connected through wires 60 and 61 to the terminals 62 and 63 of the interrupter, namely, to the terminals 62 and 63 of the radio loud speaker element 51, as shown in Figure 2.

Instead of using the construction shown in Figure 2 as an interrupter, other forms of interrupters could be used as, for instance, by a controlled cathode tube method, or by a mechanical structure as shown in Figure 3. In this form of the invention there is used an interrupting device similar to Figure 2, but instead of using the radio loud speaker element, a shaft 64 is provided having a flat surface 65 adapted to engage the rod or bar 49. This shaft is directly connected to an electric or other motor 66. If desired, the motor 66 could be connected to the rod or shaft 64 through a multiplying mechanism whereby the rod would operate at high speed and produce a large number of interruptions per minute. It is to be understood, of course, that any desired form of interrupter 16 may be used provided the same can function with infinitesimal current.

When the device is in use the hood 2 with the thermocouple 1 is mounted on a suitable support so as to swing back and forth as desired, whereby it may be aimed at objects in the sky or objects on the earth, and as it is caused to function through the use of invisible heat rays, it will function in the night time as well as in the day time, and will also function when there is a fog as well as when the weather is clear.

When a hot object is acting on the thermocouple current will flow as described and be amplified by the transformer 6, which amplified current is again amplified by the transformer 24, and this current is in turn amplified by the coupled amplification "A". When using the transformer 29 the current is amplified to increase the voltage so that a head amperage and reduce the voltage so that a head phone 43 may be caused to function, or other instrument as, for instance, a galvanometer 34. When the parts are all coupled up as just described the needle on the galvanometer 34 will function accurately to indicate the action of the thermocouple 1 including the increase and decrease of current produced by the coupler. For instance, when the coupler is being swung so as to gradually be brought in line with a heated object, current will start to flow and increase to a maximum when the thermocouple is aimed directly at the hot object. As the current increases the needle on the galvanometer 34 will continue to swing away from zero, but as soon as the thermocouple moves slightly off a direct line toward the hot object the needle will begin to move back towards zero and will reach zero substantially immediately upon the movement of the thermocouple away from the influence of the hot object.

From the construction discussed it will be seen that all parts are comparatively sturdy for a delicate instrument of this kind and, consequently, will stand the vibration of a ship, airplane or the like without being injured or caused to function inaccurately thereby. Also, by the increase in the power of the current a comparatively strong and non-delicate galvanometer or other instrument may be used as indicated at 34 in Figure 1.

I claim:—

1. A device of the character described including means forming an input circuit, said input circuit being provided with a vibrating interrupter having a pair of make-and-break contacts and a primary coil of a transformer in series with said contacts, electrically actuated means for actuating said interrupter, an alternating current amplifier connected to the secondary winding of said transformer, a transformer connected to said alternating current amplifier for reducing the voltage and increasing the amperage, and means operated by the current from the output side of the last mentioned transformer for indicating the amount of current received by said input circuit.

2. An amplifier for amplifying small direct continuous current, including an electrically actuated vibrating interrupter formed to handle minute electrical currents with substantially no loss for causing said current to be changed to pulsating current, an alternating current transformer with the primary winding in series with said interrupter, a plurality of amplifying radio tubes arranged in stages with one of the tubes connected to the secondary of said transformer, and an alternating current transformer having the primary connected to the output of the last stage of radio tube amplifiers, said last mentioned transformer being so formed that the output of the secondary thereof will be of lower voltage and greater amperage than the input current to the primary winding thereof.

PAUL H. MACNEIL.